(12) United States Patent
Cantillep

(10) Patent No.: US 6,468,361 B1
(45) Date of Patent: Oct. 22, 2002

(54) PBGA SINGULATED SUBSTRATE FOR MODEL MELAMINE CLEANING

(75) Inventor: Loreto Ycong Cantillep, Singapore (SG)

(73) Assignee: ST Assembly Test Service Ltd., Singapore (SG)

( * ) Notice: Subject to any disclaimer, the term of this patent is extended or adjusted under 35 U.S.C. 154(b) by 149 days.

(21) Appl. No.: 09/635,582

(22) Filed: Aug. 9, 2000

(51) Int. Cl.$^7$ ................................................. B08B 7/04
(52) U.S. Cl. ................................. 134/18; 134/2; 134/4; 134/5; 134/22.19; 134/25.1; 134/42; 264/39; 264/272.17; 264/272.11
(58) Field of Search ............................. 134/2, 4, 5, 18, 134/22.19, 25.1, 42, 166 R; 264/39, 272.17, 272.11

(56) References Cited

U.S. PATENT DOCUMENTS

| | | | |
|---|---|---|---|
| 4,010,143 A | * 3/1977 | Flowers .................... | 174/52.2 |
| 5,665,281 A | * 9/1997 | Drummond ............ | 264/272.17 |
| 5,780,933 A | 7/1998 | Ohmori et al. ............. | 257/788 |
| 5,795,799 A | 8/1998 | Hosoya ...................... | 438/126 |
| 5,886,398 A | 3/1999 | Low et al. .................. | 257/667 |
| 5,939,778 A | 8/1999 | Boutin et al. ............... | 257/678 |

FOREIGN PATENT DOCUMENTS

| | | |
|---|---|---|
| JP | 03277516 | * 12/1991 |
| JP | 10172997 | * 6/1998 |

* cited by examiner

*Primary Examiner*—Randy Gulakowski
*Assistant Examiner*—M. Kornakov
(74) *Attorney, Agent, or Firm*—George O. Saile; Stephen B Ackerman

(57) ABSTRACT

A new method is provided to clean melamine deposits from tools and components that are used to form molds around and to therewith encapsulate BGA devices. The cleaning process applies a dummy BGA substrate as part of and during the cleaning procedure. This dummy BGA substrate replaces the conventionally used copper strips that shield areas of the molding tools during the cleaning cycle. The dummy copper strips require, during and as part of the melamine cleaning process, frequent cleaning, which adds considerable to the time and expense of the melamine cleaning process.

16 Claims, 6 Drawing Sheets

PBGA SINGULATED SUBSTRATE FOR MODEL MELAMINE CLEANING

BACKGROUND OF THE INVENTION (1) Field of the Invention

The invention relates to the fabrication of integrated circuit devices, and more particularly, to a method of cleaning PBGA packages that results in reduced-cost cleaning procedures while maximizing the frequency of cleaning cycles.

(2) Description of the Prior Art

The continuing decrease in semiconductor device dimensions coupled with the continuing increase in device densities have, over the years, led to the development of a number of packaging techniques for the packaging of very dense and complex semiconductor devices. Increased device complexity further required improved methods of accessing the semiconductor devices by means of the device input/output (I/O) connections. To accommodate an increased number of I/O connections, semiconductor packages have evolved from lead frame packages such as the Dual In Line (DIL) and Quad Flat Package (QFP) to laminated packages such as the Ball Grid Array (BGA) package.

Concurrent with the use of various packaging techniques, methods and processes have been developed that are aimed at providing increased protection to the packaged semiconductor devices. Where semiconductor devices are mounted on a supporting substrate, such as a Printed Circuit Board (PCB), these devices are typically encapsulated prior to their mounting on the PCB so as to minimize physical damage to the devices and the fragile interconnecting wires or circuitry that are used to interconnect the semiconductor devices. Not only does the encapsulation prevent physical damage to the packaged device, the encapsulation also isolates the packaged device from the environment and in this manner prevents corrosive effects on device components and wiring that can result from contact with moisture or from surface oxidation.

The packaging arrangements that are typically used for the packaging of semiconductor devices employ a number of different approaches, whereby these approaches can be distinguished between methods of providing a (rigid or flexible) support structure on which the semiconductor device is mounted with interconnect lines provided on the surface of the support structure, methods of providing a chip-on-surface mounting technique whereby the supporting structure can comprise laminated layers of interconnect lines that are used in combination with interconnect lines on the surface of the supporting structure and methods of providing laminated packages that use cavities for the mounting of the semiconductor devices. Where possible, the methods of packaging are designed such that automated packaging processes can be used for obvious reasons of costs incurred as part of the packaging process. In this respect, the supporting structure that uses a cavity for the mounting of the semiconductor device does not lend itself to automatic packaging processes since, for the various packaging approaches that have been highlighted, the semiconductor device must, after it has been packaged, as yet be encapsulated, which is a processing step that cannot readily be monitored using cavity based supporting structures.

For the process of encapsulating the semiconductor device, transfer molds are typically used whereby the transfer mold is, during the process of encapsulation, positioned over the to be encapsulated device and removed from that location after the encapsulation has been completed. Using this process, the encapsulant covers at least the semiconductor device and any surrounding (wire bonded) interconnect wire but may, in addition, cover larger surface portions of the supporting structure.

For a typical mounting of a chip on the surface of a laminated substrate, whereby the substrate can be either ceramic (making the substrate rigid) or can contain an organic or plastic material (making the substrate flexible), electrical interconnect lines are formed within the laminated layers of the substrate using conventional methods of metal deposition and patterning that apply standard photolithographic methods and procedures. The various layer of the laminated substrate are insulated from each other using dielectric materials such as a polyimide that can be used to separate for instance metal power and ground planes in the substrate. Electrical connections between the layers of the laminated substrate are formed by conductive vias, the opening of the via is, after this opening has been formed, filled with a conductive material in order to establish the electrically conductive path between the various layers. After the required interconnect patterns have in this manner been established in the laminated substrate, the semiconductor chip is positioned on the surface of the substrate and attached to the substrate by a suitable die attach material such as epoxy. This layer of epoxy serves not only to hold the semiconductor die in place but also serves as a heat transfer medium between the die and the substrate. The top surface of the semiconductor die is connected (wire bonded) to the conductive traces on the surface of the substrate after which the die including the bonded wires can be encapsulate. Electrical interconnects must then be established between the substrate (to which the die is at this time connected) and the surrounding electrical circuits to which the substrate is connected. Electrical traces have also been provided in the lower surface of the substrate, a solder mask is deposited over the bottom surface of the substrate, contact balls are positioned in alignment with the contact points in the lower surface of the substrate and re-flowed thereby connecting the contact balls with the electrical traces in the bottom surface of the substrate and completing the interconnects between the (surface mounted) semiconductor die and the contact balls of the supporting substrate. The method described above is a method of connecting a semiconductor device using wire bond techniques. In addition and as a substitute to the wire-bonding techniques, known connection techniques in the art such as flip-chip techniques can be applied to interconnect the semiconductor die.

The above indicated method of packaging a semiconductor die employs one (lower) mold, the process of applying the mold compound typically uses an upper mold that matches with and overlays the lower mold. Suitable recesses are formed in this case in both the lower and the upper mold in order to enable and facilitate the process of applying the mold around the semiconductor device. During the process of applying the mold compound over the semiconductor die, the die that at this time has been mounted on the surface of a substrate, is inserted with its substrate into a cavity that has been provided for this purpose in a lower mold. An upper mold is aligned with the lower mold, a recess has for purposes of alignment (between the two molds) been provided in the upper mold while a matching opening is provided in the lower mold. An alignment pin is inserted through the opening in the lower mold after which the alignment opening in the upper mold is aligned with the alignment pin that protrudes through the lower mold.

The upper mold contains a cavity that has the internal contours of the mold that needs to be applied over the semiconductor die. After the upper mold has been aligned with the lower mold, the mold cavity in the upper mold overlays the semiconductor die that has been inserted in the lower mold and that is mounted on a laminated substrate. The mold material is then inserted, typically using the same opening that is used to insert the inter-mold alignment pin, from where the mold is forced via a channel (that is provided between the upper and the lower mold) into the mold cavity of the upper mold.

Manufacturing automation and the control of the cost that is incurred during the molding (encapsulation) process requires that the process of molding of the devices can proceed applying the mold to a number of devices in a relatively rapid sequence whereby a number of devices are processed simultaneously. This leads to the processing of multiple substrates simultaneously, the multiple substrates are provided and handled in strip form. The multiple substrates are interconnected and form a substrate strip, after the molding process has been completed the substrates are separated or singulated from each other. This process is further described below.

It must further be realized that, concurrent with substrate strips, multiple molds are typically contained within one mold bar during the process of inserting the mold compound. These mold bars are individually removable, the mold bars can be differentiated between upper and lower mold bars. The upper and lower mold bars are further mounted in and supported by an upper and a lower mold frame and can be readily removed from the mold frames such that flexibility and easy convertibility from one type of mold to the other is provided. The source of the mold that is inserted over the semiconductor die is referred to as the mold pot, it is common practice to provide a multiplicity of mold pots on a separate bar (the runner bar) that is mounted between two adjacent mold bars and that serves to supply the mold compound to the individual molds for simultaneous molding.

FIG. 1 shows a top view of a substrate strip 10 that contains four individual substrates 12. Openings 14 have been provided in the substrate strip 10, these openings are used for attachment of the substrate strip 10 to other processing equipment during additional processing steps, these processing steps are not further described at this time. Stress relieve between the individual substrates 12 and the substrate strip 10 is provided by the substrate separation slots 16. These separation slots assure that the substrates 12, although the substrate 12 are interconnected to and are part of the substrate strip 10, act as individual units and do not incur warp or any other stress related deformity during the handling of the substrate strip 10 or at the time that the substrates 12 are singulated. Each of the corners of the substrates 12 is further provided with an opening 18, which improves the singulation results by providing a well controlled circumference of the singulated substrate. The semiconductor die or chip is placed in the middle of each of the substrates 12, these die placement areas are highlighted as areas 20.

The substrates 12 that are shown in FIG. 1 are the laminated substrates that have previously been described and contain layers of interconnect lines and points of electrical interconnect on both surfaces of the substrate. These interconnect points are, for reasons of clarity, not shown in FIG. 1. The laminated substrate 12 shown in FIG. 1 are the substrates that are further used for the creation of BGA packages and package interconnects. The substrates 12 are, in other words, desired end products of a processing sequence, these substrates 12 are only indirectly related to the invention.

U.S. Pat. No. 5,886,398 (Low et al.) shows a process that involves a transfer molding and substrate and singulation. The molded packages have an internal mold gate. However, this reference differs from the invention.

U.S. Pat. No. 5,780,933 (Ohmori) shows a package using a transfer molding. However, this reference differs from the invention.

U.S. Pat. No. 5,795,799 (Hosoya) shows a molding process with transfer molding.

U.S. Pat. No. 5,939,778 (Boutin et al.) shows a related molding process.

SUMMARY OF THE INVENTION

A principle objective of the invention is to provide an improved method of cleaning of mold material that is typically used to encapsulate BGA devices.

In accordance with the objectives of the invention a new method is provided to clean melamine deposits from tools and components that are used to form molds around and to therewith encapsulate BGA devices. The cleaning process applies a dummy BGA substrate as part of and during the cleaning procedure. This dummy BGA substrate replaces the conventionally used copper strips that shield areas of the molding tools during the cleaning cycle. The dummy copper strips require, during and as part of the melamine cleaning process, frequent cleaning, which adds considerable to the time and expense of the melamine cleaning process.

DESCRIPTION OF THE PREFERRED EMBODIMENTS

For conventional methods of cleaning melamine from the surface of runner bars and cavity bars, specially designed dummy strips (made of copper) are used that shield or protect certain areas against penetration of melamine into these areas. The objective of the shielding is to assure that no melamine penetrates these areas (during the process of cleaning remnants of melamine from the chase) so that, as a consequence, no melamine needs to as yet be removed therefrom. These dummy strips, typically made of copper, must, for a typical cleaning cycle, be cleaned a number of times during and as part of the cleaning cycle. This cleaning of the dummy strips can require between 24 and 36 cleaning cycles of the dummy strips before the required end result of removing melamine has been obtained. This repetitive cleaning of these specially created dummy strips of copper is very time consuming and expensive and must therefore, if possible, be avoided.

The process of the invention provides a method where the conventional, specially provided dummy strips of copper are not used as part of the melamine cleaning process. In its place the process of the invention uses a dummy singulated substrate strip that does not (as opposed to the conventional copper strips) need to be cleaned during and as part of the melamine cleaning process and that, at the end of the melamine cleaning process, can be discarded without incurring any significant cost to the cleaning process. During regular melamine insertion, after this insertion has been completed, the devices are, mounted on their individual substrates, removed from the substrate strip. The substrate strip, after the removal of the devices from the strip, now becomes a dummy substrate strip. These dummy substrate strips are in a conventional cleaning process, not used. The process of the invention makes use of the dummy substrate strips and substitutes, during the process of cleaning of the melamine insertion chase, the dummy strips for the convention (copper) specially designed strip. Since the dummy strips of the invention are normally discarded, the process of the invention reduces the cleaning cost by negating the need to clean the convention (copper) strips and replacing these strips with dummy strips that can be discarded without incurring any cost.

Figure 2:
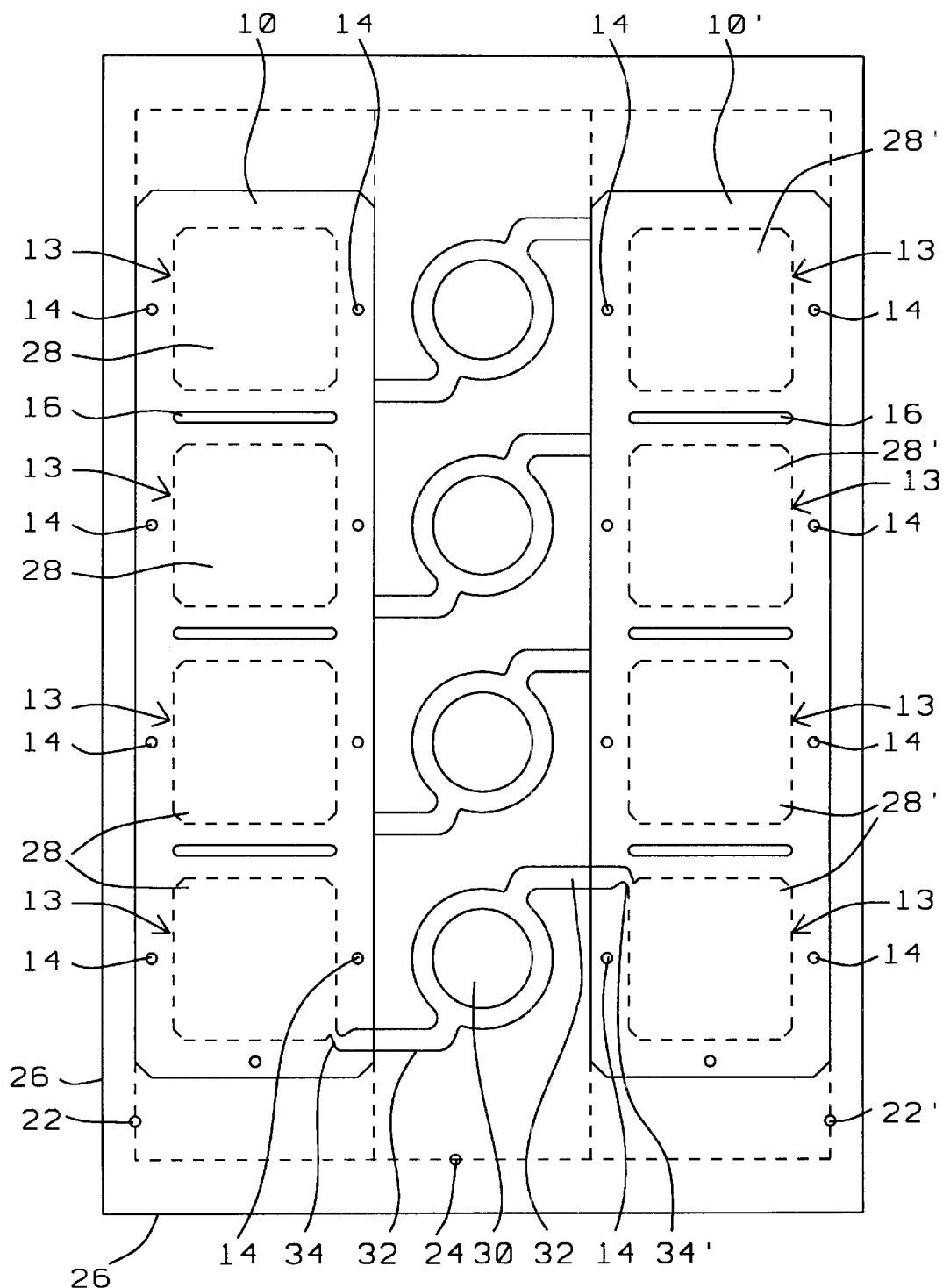
FIG. 2 shows a top view of two cavity bars that are separated by a runner bar, this during the operation of forming BGA device molding.

FIG. 2 shows a top view of the molding equipment to which two substrate strips 10 and 10' have been attached. The two cavity bars 22 and 22' are separated by the runner bar or center block 24, all three bars are contained within and supported by the mold chase 26. Substrate strip 10 is attached to cavity bar 22 via the openings 14, these openings 14 align with corresponding pins that protrude from the surface of the cavity bar 22. Openings 13 are the areas where the substrates are located prior to singulation. Each of the openings 13 is contained with the substrate strip 10 and 10' and is aligned with a cavity 28/28', which are the cavities that has been created in the cavity bars 22/22'. Each of the cavities 28/28' is connected with the mold supply containers (pots) 30 by means of a channel 32 that is part of the runner bar 24. It is clear that the mold that is supplied from the mold container 30 flows through channel 32 and enters the mold cavity 28/28' via the channel opening 34/34'.

One of the problems that is encountered in applying the mold material as detailed above is that the mold compound enters the mold cavity via the channel 32 and the channel opening 34/34' after which time must be allotted for the mold to solidify. Since there is no clear division between the path of the flow of the mold that clearly separates the regions where the mold is to harden (the mold cavities 28/28') and the path through which the mold is supplied to the mold cavity (the mold channels 32 and the channel openings 34/34'), it is to be expected that the mold will not only settle and harden in the mold cavity 28 but will also settle and harden in the mold channels 32 and the channel openings 34/34'. The undesired mold must be removed in order to retain only the mold within the mold cavity 28/28', a process-of removal that must be performed prior to the singulation of the substrate strips 10/10' into individual substrates. The fact that the channel openings 34/34' are of a smaller diameter than the diameter of the channels 32 makes this process of removal somewhat easier since these narrow openings 34/34' provide some separation between the mold cavities 28/28' and the mold channels 32. It might be suggested that the process of removal of the excess mold material can be accomplished by removing the runner bar 24 from in-between the substrates 10 and 10'. It must however be remembered that the mold partially flows over the surface of the substrate on its way to the mold cavity. This mold has the tendency to adhere to the surface of the substrate after the mold has been allowed to solidify. In therefore removing the runner bar 24 from between the two substrates 10 and 10', the mold that adheres to the surface of the substrate 10 and 10' tends to damage this surface at this time of runner bar 24 removal. This process of surface damage is further aggravated if the mold compound is allowed to accumulate between successive mold operations. To prevent this accumulation, it is common practice to remove remaining mold compound from the surface of the runner bar 24 and specifically from the mold channels 32 and the mold channel openings 34/34' between mold operations.

One of the materials that is used as a mold compound is melamine, the cleaning of the melamine is performed at regular intervals and after a certain number of mold operations have been performed. Current practice calls for one cleaning operation after 200 operations of mold insertion.

In the current practice as shown in FIG. 2, the strips 10 and 10' are copper or brass strips. It is the purpose of the invention to use singulated BGA substrates that have a geometric pattern that is similar to the geometric pattern of substrate strips 10 and 10'. These singulated BGA substrate will replace the currently used copper strips during the melamine insertion process.

Figure 3:
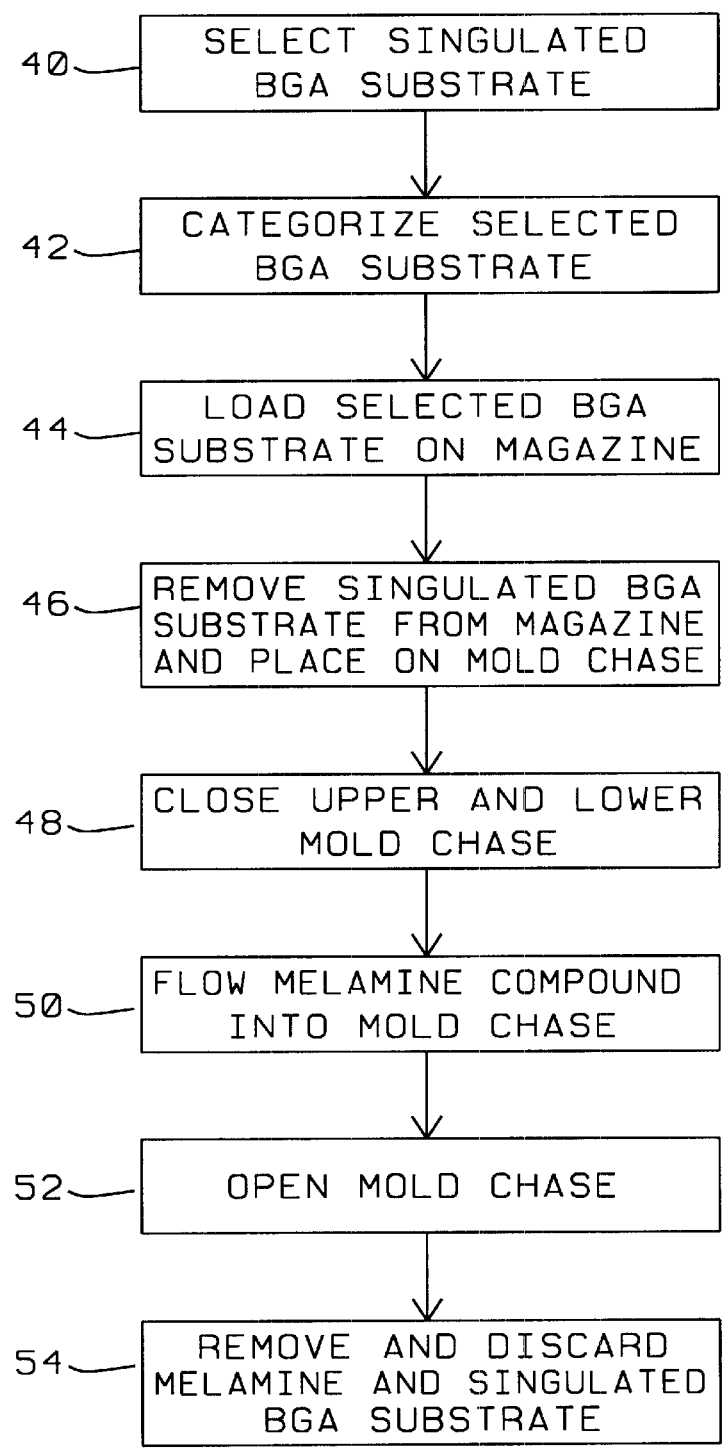
FIG. 3 shows the processing flow of the invention that is required to achieve BGA singulated substrate mold melamine cleaning. The processing of the invention addresses only and exclusively the cleaning cycle that is required to clean a mold chase and to thereby remove and remaining melamine from a production mold case.

Referring now specifically to FIG. 3, there is shown the processing flow of the invention that is aimed at applying a mold compound over the surface of BGA devices and removing melamine from the surface of components such as cavity bars and runner bars, after the mold compound has been applied over the surface of BGA devices.

The first step of the process of the invention, FIG. 3, step 40, is the selection of a BGA substrate strip, which is any BGA substrate strip from which the BGA devices have been singulated. This BGA substrate is further detailed as BGA substrate 11 in FIG. 5. This selected BGA substrate is for the subsequent mold insertion and cleaning procedure designated as the dummy BGA substrate strip.

After the dummy BGA substrate strip has been obtained as indicated above under FIG. 3, step 40, this dummy substrate is categorized and identified in accordance with the substrate thickness and the substrate size, such as a size of 27×27 mm or 35×35 mm and a thickness of 0.36 mm or 0.56 mm. This categorization, FIG. 3, step 42, serves as the basis for using the dummy substrate strip during the cleaning cycle, whereby a particular dummy substrate strip is matched with and used for BGA devices that have characteristics of thickness and size that are identical to the characteristics of thickness and size as the dummy BGA substrate strip.

Figure 4:
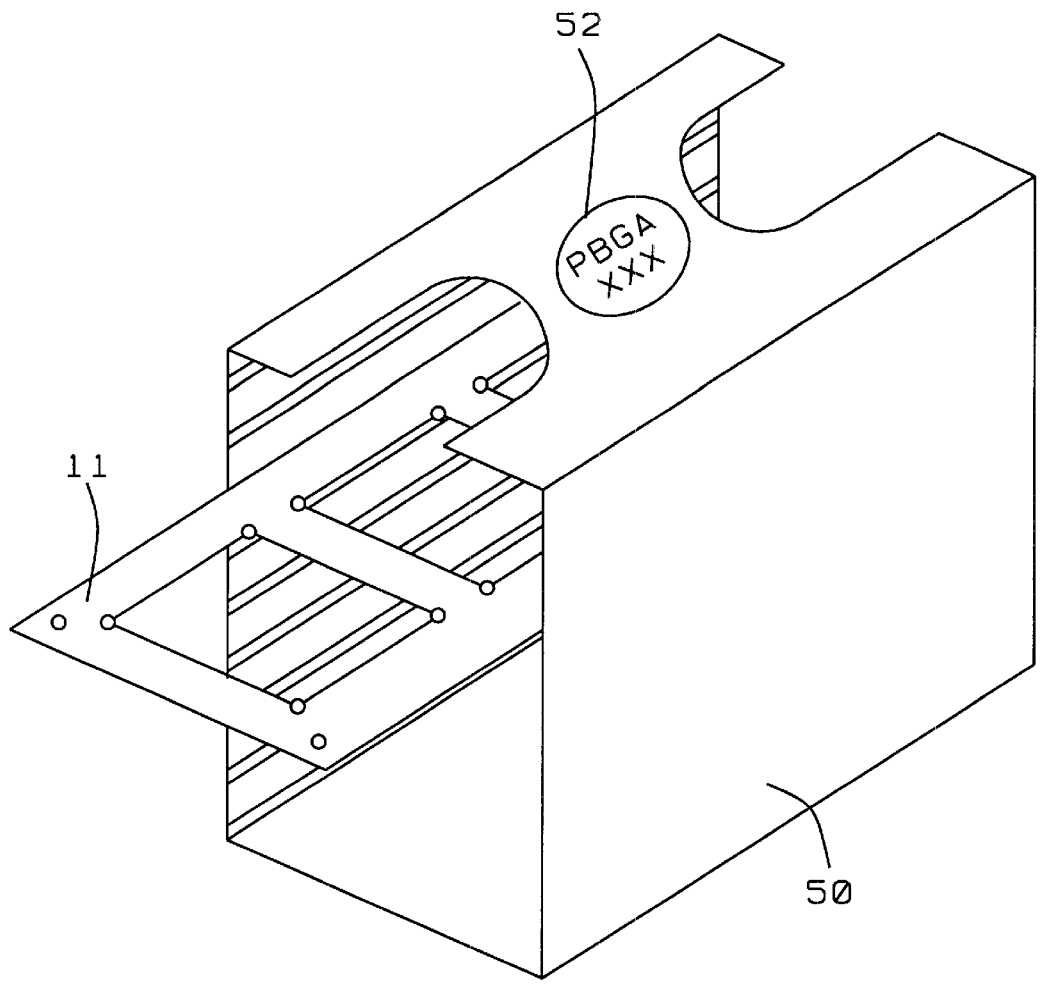
FIG. 4 shows a three dimensional view of a BGA magazine into which singulated substrates have been inserted.

FIG. 3, step 44 shows that the singulated dummy substrate strip is next loaded onto a BGA magazine. The BGA magazine is further highlighted in FIG. 4 following. After the singulated dummy substrate strips have been loaded onto the BGA magazine, the magazine is moved to the production where the cleaning process takes place. The BGA magazine is a standard carrier used for the storing and moving of BGA substrate strips. As such, the BGA magazine that is shown in FIG. 4 is not basic to the process of the invention but is used since its use is standard practice in a BGA molding insertion environment. This use of the BGA magazine is further facilitated since the dummy singulated substrate strips have the same physical characteristics as the production strips that have been processed using the molding chase that is to be cleaned using the dummy singulated substrate strips.

FIG. 3, step 46 indicates that, after the singulated dummy substrate strips have been loaded onto the BGA magazine and the BGA magazine has been moved to the mold insertion station that needs to be cleaned, a dummy singulated BGA substrate strip is removed from the BGA magazine and placed on the mold chase 26 (FIG. 2). After two dummy singulated substrate strips have been loaded into the mold chase 26, the mold chase is closed, FIG. 3, step 48, and a melamine compound (functioning as a cleaning agent) is inserted (flows through) the pots 30, the runners 32 and the cavities 28 of mold chase 28 (FIG. 2), FIG. 3, step 50. The melamine is used as a cleaning compound because it forms one solid with the melamine that needs to be cleaned from inside surfaces of the mold chase so that, when removing the melamine that is runs into the mold chase, the surfaces that contain melamine remnants are also cleaned of the melamine. At the completion of this step (time or volume of inserted mold compound driven) the mold chase is opened, FIG. 3, step 52.

The mold chase at this time in the mold cleaning cycle of the mold chase contains a body of melamine mold compound that can now be removed from the mold chase, and, with it, the dummy singulated substrate strip can be removed. The dummy substrate strip has served the same function as the previously used (copper) strips that were used for partial chase shielding and protection, the discarding of the dummy substrate strip at this time does not, as previously pointed out, add or incur any expense to the mold cleaning cycle of the mold chase.

FIG. 4 shows a three-dimensional view of a BGA magazine 50 into which singulated substrates 11 have been inserted. A label 52 is attached to the surface of magazine 50 for easy identification of the magazine 50. It is clear that the magazine 50 provides a method of simultaneously storing and handling multiple singulated substrates 11.

Figure 1:
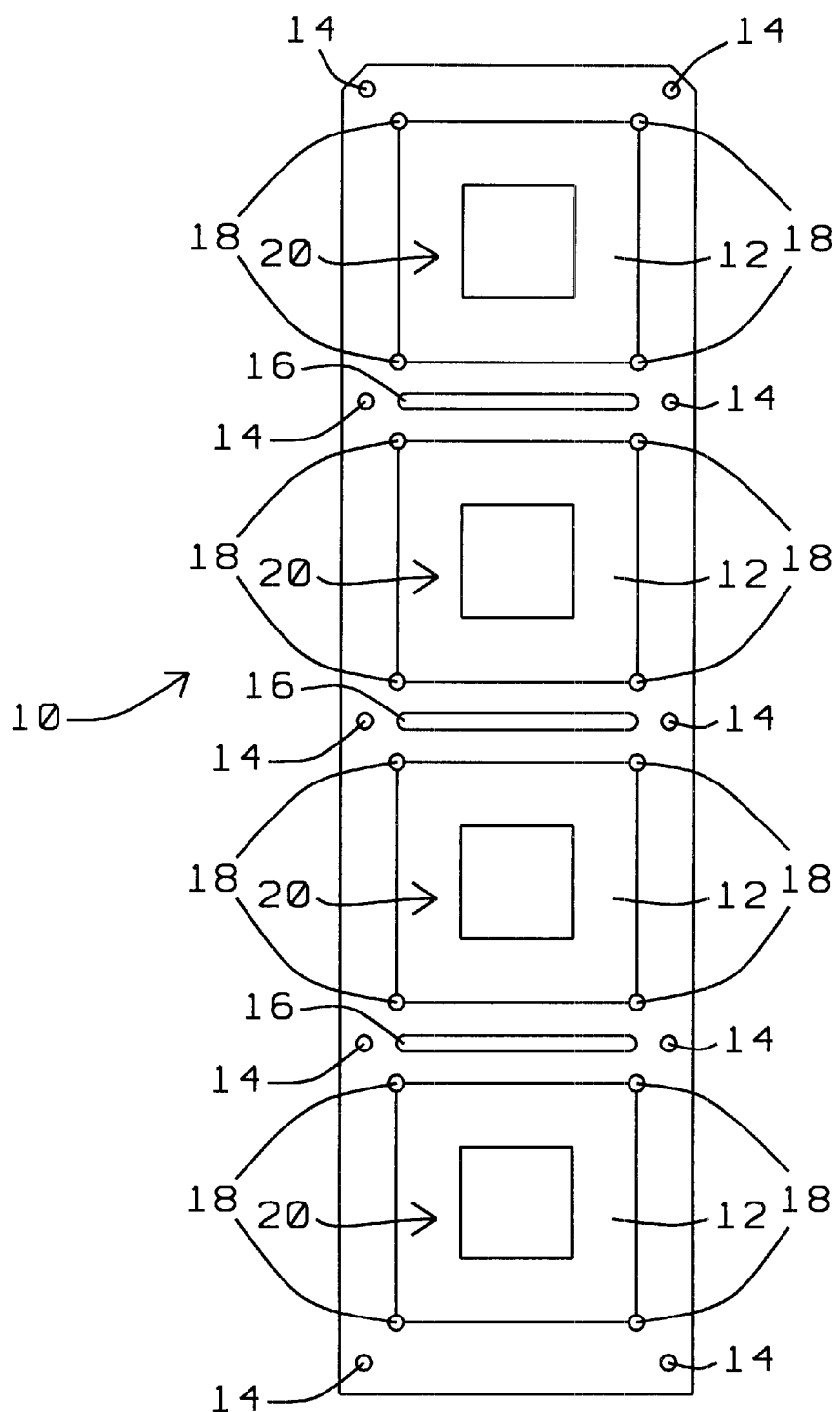
FIG. 1 shows a top view of a conventional substrate strip.
Figure 5:
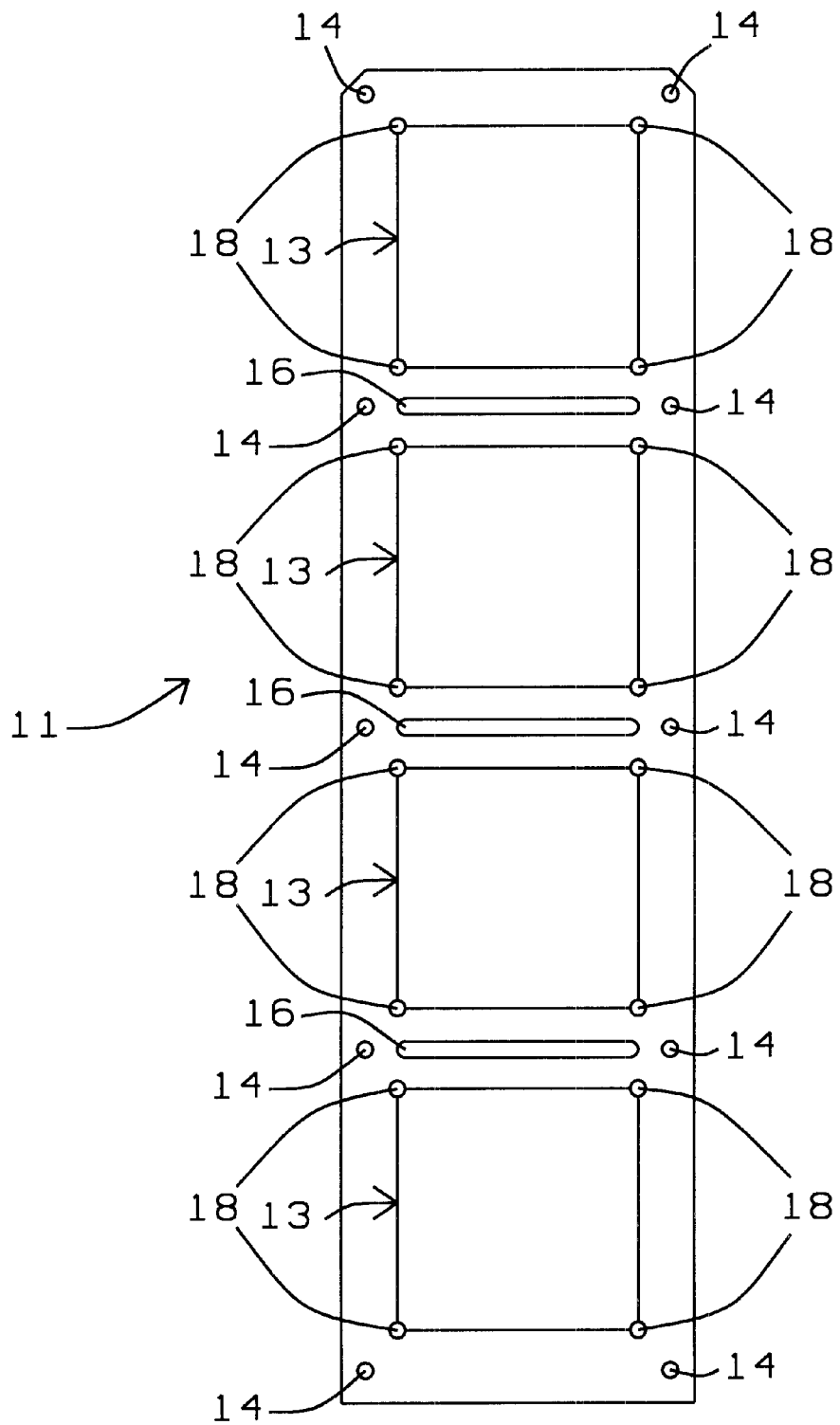
FIG. 5 shows a top view of a substrate strip after singulation. This is the dummy or singulated substrate strip from which the laminated substrates 12 (FIG. 1) and the thereupon mounted chips have been removed. This dummy substrate is used during the cleaning process of the invention.

FIG. 5 shows a top view of a dummy substrate strip 11 after singulation. The substrate strip 13 has four openings 13 from where the individual substrate and their chips have been removed or singulated. The items that are highlighted in FIG. 5 are identical to these items as they have been highlighted for FIG. 1 above and need therefore not be further explained at this time.

Figure 6:
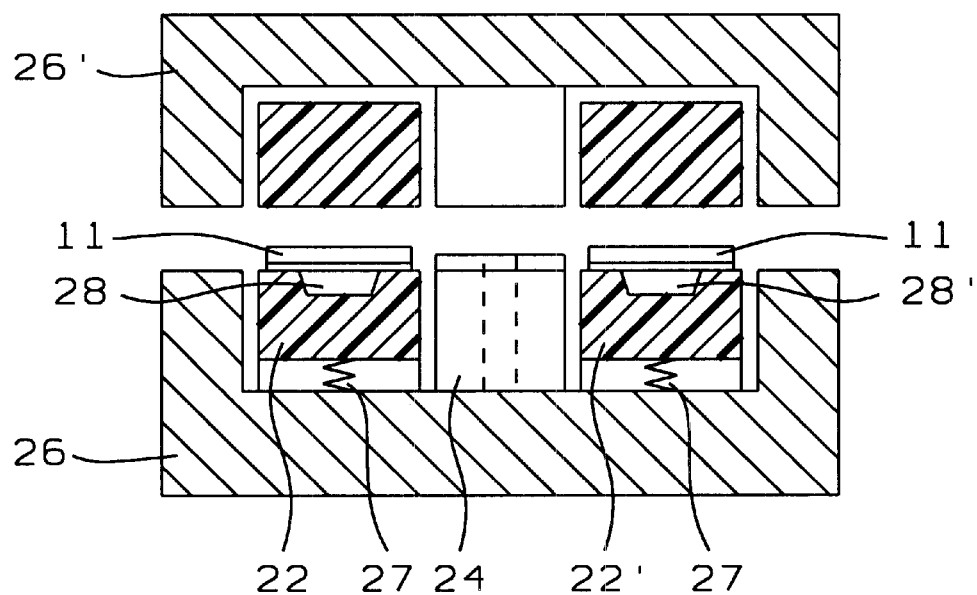
FIG. 6 shows a vertical cross section of the two cavity bars that are separated by a runner bar (see FIG. 2), containing singulated BGA strips, at the time that the top mold chase and the bottom mold chase are closed.

FIG. 6 shows a vertical cross section of the two cavity bars that are separated by a runner bar of FIG. 2 containing singulated BGA strips, this at the time that the top mold chase 26' (not shown in FIG. 2) and the bottom mold chase 26 (see also FIG. 2) are brought into close physical proximity to each other (are "closed"). As previously highlighted in FIG. 2, 22 and 22' are the cavity bars 22 and 22' that are separated by the runner bar or center block 24. The upper mold chase is highlighted with 26', the lower mold chase (see also FIG. 2) is highlighted with 26. Singulated BGA strips 11 are inserted in the cavity bars 22 and 22', the mold cavity (see also FIG. 2) is shown and highlighted with 28. springs 27 press the singulated EGA strip against the upper mold chase 26'.

The process of the invention has therefore achieved the following:

a simplification of the cleaning operation by removing the previously required steps of cleaning dummy copper strips; this latter process is very time consuming in view of the fact that the process must be repeated numerous times during one melamine cleaning operation, and the process of the invention has replaced the use of dummy copper strips with the use of a dummy BGA substrate strips which perform the same function as the previously used dummy copper strips but which can be readily discarded at the completion of the melamine cleaning cycle without thereby adding significant to the cost of the melamine cleaning operation.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A method of removing mold compound from tools and components that are used to encapsulate semiconductor devices, comprising the steps of:

providing a mold chase having an upper and a lower mold chase;

providing dummy singulated semiconductor device substrate strips;

placing said dummy singulated semiconductor device substrate strips onto said lower mold chase said lower mold chase having been provided with mold pots, mold runners and mold cavities whereby said dummy singulated semiconductor device substrate strips have openings that align with said mold cavities;

closing said mold chase by lowering said upper mold chase over said lower mold chase thereby enclosing said dummy singulated semiconductor device substrate strips between said upper and lower mold chase;

flowing a cleaning compound through said mold pots, said mold runners and said mold cavities;

opening said mold chase by raising said upper mold chase from said lower mold chase thereby exposing said dummy singulated semiconductor device substrate strips between said upper and lower mold chase further exposing said cleaning compound; and removing and discarding said cleaning compound, removing and discarding said dummy singulated semiconductor device substrate strips from said mold chase.

2. The method of claim 1 wherein said dummy singulated semiconductor device substrate strips are production semiconductor device substrate strips from which all therein comprised semiconductor devices and their substrates have been removed, creating openings in said dummy singulated semiconductor device substrate strips that align with said mold pots in said lower mold chase.

3. The method of claim 1 wherein said cleaning compound comprises melamine.

4. The method of claim 1 wherein said semiconductor devices are Plastic Ball Grid Array devices.

5. The method of claim 1 wherein said mold compounds comprise melamine compound.

6. The method of claim 1 further comprising additional step of categorizing said dummy singulated semiconductor device substrate strips by observing physical characteristics of size and thickness of said dummy singulated semiconductor device substrate strips, whereby each selected dummy singulated semiconductor device substrate strip is assigned an operational code or designation an operational code or designation reflects future processes of said mold compound cleaning for which a categorized dummy singulated semiconductor device substrate strip can be used, said additional step to be performed prior to said step of placing said dummy singulated semiconductor device substrate strips onto said lower mold chase.

7. The method of claim 6 wherein said physical characteristics of size and thickness comprise substrate sizes 27×27 mm or 35×35 mm or any other suitable substrate size, and substrate thicknesses of 0.36 mm or 0.56 mm or any other suitable substrate thickness.

8. The method of claim 6 wherein said dummy singulated semiconductor device substrate strips, after the step of categorizing said dummy singulated semiconductor device substrate strips has been completed, are assigned to and used for cleaning mold compound from surfaces that have been used during a molding process of semiconductor devices that have characteristics of size and thickness that are equal to said characteristics of size and thickness of said dummy singulated semiconductor device substrate strips.

9. A method of removing mold compounds from a mold chase that is used to encapsulate semiconductor devices, said mold chase to comprise an upper and a lower mold chase, said lower mold chase to comprise mold pots mold runners and mold cavities, the said method comprising:

selecting one or more semiconductor device substrate strips from among a collection of production semiconductor device substrate strips said selected semiconductor device substrate strips to be used as dummy semiconductor device substrate strips during the process of the invention;

removing all semiconductor devices and thereto connected substrates from said selected semiconductor device substrate strips thereby creating dummy singulated semiconductor device substrate strips;

categorizing said dummy singulated semiconductor device substrate strips by observing dimensional characteristics of size and thickness of said dummy singulated semiconductor device substrate strips thereby classifying said dummy singulated semiconductor device substrate strips for use during a process of removing said mold compound from said mold chase that is used to encapsulate semiconductor devices;

loading said categorized dummy singulated semiconductor device substrate strips into a semiconductor device magazine;

moving said semiconductor device magazine to said mold chase that is used to encapsulate semiconductor devices;

selecting one or more of said categorized dummy singulated semiconductor device substrate strips;

inserting said one or more selected categorized dummy singulated semiconductor device substrate strips into said lower mold chase;

enclosing said one or more of said selected categorized dummy singulated semiconductor device substrate strips between said upper and said lower mold chase by lowering said upper mold chase over said lower mold chase;

flowing a cleaning agent through said mold pots, mold runners, and mold cavities of said lower mold chase;

allowing for a measurable time while said cleaning agent react with said mold compound that is to be cleaned from said mold chase;

exposing said one or more of said selected categorized dummy singulated semiconductor device substrate strips by lifting said upper mold chase away from said lower mold chase; and removing and discarding said categorized dummy singulated semiconductor device substrate strips together with said cleaning agent from said mold chase.

10. The method of claim 9 wherein said semiconductor devices are Plastic Ball Grid Array devices.

11. The method of claim 9 wherein said mold compounds comprises melamine compound.

12. The method of claim 9 wherein said cleaning agent comprises melamine compound.

13. The method of claim 9 wherein said categorizing said dummy singulated semiconductor device substrate strips consist of observing physical characteristics of size and thickness of said dummy singulated semiconductor device substrate strips whereby each selected dummy singulated semiconductor device substrate strip is assigned an operational code or designation such that this code or designation reflects future processes of melamine cleaning for which a categorized dummy singulated semiconductor device substrate strip can be used.

14. The method of claim 13 wherein said physical characteristics of size and thickness comprise substrate sizes 27×27 mm or 35×35 mm or any other suitable substrate size and substrate thicknesses of 0.36 mm or 0.56 mm or any other suitable substrate thickness.

15. The method of claim 9 wherein said dummy singulated semiconductor device substrate strips, after the step of categorizing said dummy singulated semiconductor device substrate strips has been completed, are assigned to and used for cleaning of mold compound from surfaces that have been used during a molding process of semiconductor devices that have characteristics of size and thickness that are equal to said characteristics of size and thickness of said dummy singulated semiconductor device substrate strips.

16. The method of claim 9 whereby loading of said categorized dummy singulated semiconductor device substrate strips into a semiconductor device magazine is performed such that orientation of said dummy substrate in said semiconductor device magazine does not deviate from production unit orientation.

* * * * *

UNITED STATES PATENT AND TRADEMARK OFFICE
CERTIFICATE OF CORRECTION

PATENT NO. : 6,468,361 B1
DATED : October 22, 2002
INVENTOR(S) : Cantillep

It is certified that error appears in the above-identified patent and that said Letters Patent is hereby corrected as shown below:

<u>Column 5,</u>
Line 63, delete "process-of" and insert therefore -- process of --

<u>Column 7,</u>
Line 61, delete "EGA" and insert therefore -- BGA --

<u>Column 10,</u>
Line 26, delete "consist" and insert therefore -- consists --

Signed and Sealed this

Fifth Day of October, 2004

JON W. DUDAS
*Director of the United States Patent and Trademark Office*